United States Patent [19]

Banzhaf et al.

[11] 4,428,228

[45] Jan. 31, 1984

[54] TESTING ARRANGEMENTS FOR MULTI-TESTING INJECTION NOZZLES

[75] Inventors: Werner Banzhaf, Sindelfingen; Klaus Brenner; Ewald Eblen, both of Stuttgart, all of Fed. Rep. of Germany

[73] Assignee: Robert Bosch GmbH, Stuttgart, Fed. Rep. of Germany

[21] Appl. No.: 304,046

[22] Filed: Sep. 21, 1981

[30] Foreign Application Priority Data

Nov. 8, 1980 [DE] Fed. Rep. of Germany ....... 3042236
Jul. 16, 1981 [DE] Fed. Rep. of Germany ....... 3128072

[51] Int. Cl.[3] ...................... G01M 19/00; G01M 3/08; G01M 15/00

[52] U.S. Cl. ...................................... 73/119 A; 73/47; 73/168; 73/49.7

[58] Field of Search ..................... 73/168, 119 A, 49.7, 73/47; 74/567

[56] References Cited

U.S. PATENT DOCUMENTS 2,629,555 2/1953 Hartridge ........................ 73/119 A
2,924,971 2/1960 Schroeder et al. .................. 73/168
3,117,444 1/1964 Taylor ............................. 73/119 A
3,478,580 11/1969 Siemietkowski et al. ........ 73/119 A
3,593,884 7/1971 Sasnett, Jr. ........................ 74/567 X
3,816,029 10/1974 Bowen et al. .................... 417/539 X
3,973,944 8/1976 Aprill, Jr. .......................... 73/168 X
4,165,635 8/1979 Komaroff et al. ................ 73/119 A
4,181,017 1/1980 Markle ................................ 73/168

FOREIGN PATENT DOCUMENTS 476394 11/1975 U.S.S.R. ................................ 74/567
542049 3/1977 U.S.S.R. ................................ 74/567

*Primary Examiner*—Jerry W. Myracle
*Assistant Examiner*—Tom Noland
*Attorney, Agent, or Firm*—Michael J. Striker

[57] ABSTRACT

A testing arrangement for testing injection nozzles in a nozzle holder combination, has a first testing circuit provided with a first pump for a hydraulic pressure medium and arranged for testing nozzles as to the throughflow, and a second circuit provided with a second pump for the hydraulic pressure medium and arranged for testing the nozzles as to the opening pressure, buzzing condition, tightness of nozzle holder combination and if necessary seat tightness and needle play of a nozzle, wherein the circuits are arranged so as to perform testing during operation of the nozzles.

12 Claims, 6 Drawing Figures

TESTING ARRANGEMENTS FOR MULTI-TESTING INJECTION NOZZLES

BACKGROUND OF THE INVENTION

The present invention relates to a testing arrangement for testing injection nozzles in a nozzle holder combination as to through flow, opening pressure, buzzing condition, etc. in which a pressure medium of constant temperature is supplied by a pump over a control device to a nozzle holder combination in a receiving device.

Testing arrangements of the above-mentioned general type are known in the art. With the known testing arrangements it is possible to perform only individual tests, and objective tests can only be partially performed. All this leads to a not satisfactory performance of the testing arrangement.

SUMMARY OF THE INVENTION

Accordingly, it is an object of the present invention to provide a testing arrangement which avoids the disadvantages of the prior art.

More particularly, it is an object of the present invention to provide a testing arrangement in which several testing operations can be performed in a simple way in a common aggregate and particularly in an automatic manner, which simultaneously does not exclude a possibility to perform individual tests separately from one another.

Still another object of the present invention is to provide such a testing arrangement in which testing time per tested data is considerably reduced and testing quality is increased.

It is also an object of the present invention to provide a testing arrangement which utilizes an objective testing method for testing opening pressure and buzzing conditions.

In keeping with these objects and with others which will become apparent hereinafter, one feature of the present invention resides, briefly stated, in a testing arrangement which has a first testing circuit provided with a first pump for a hydraulic pressure medium and arranged for testing the nozzles as to throughflow, and a second circuit provided with a second pump for the hydraulic pressure medium and arranged for testing as to the opening pressure, buzzing condition, tightness of nozzle holder combination and if necessary seat tightness and needle play of the nozzle, wherein the circuits are arranged so as to perform testing during operation of the nozzles.

When the testing arrangement is designed in accordance with the present invention, the above-mentioned objects are reliably attained.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
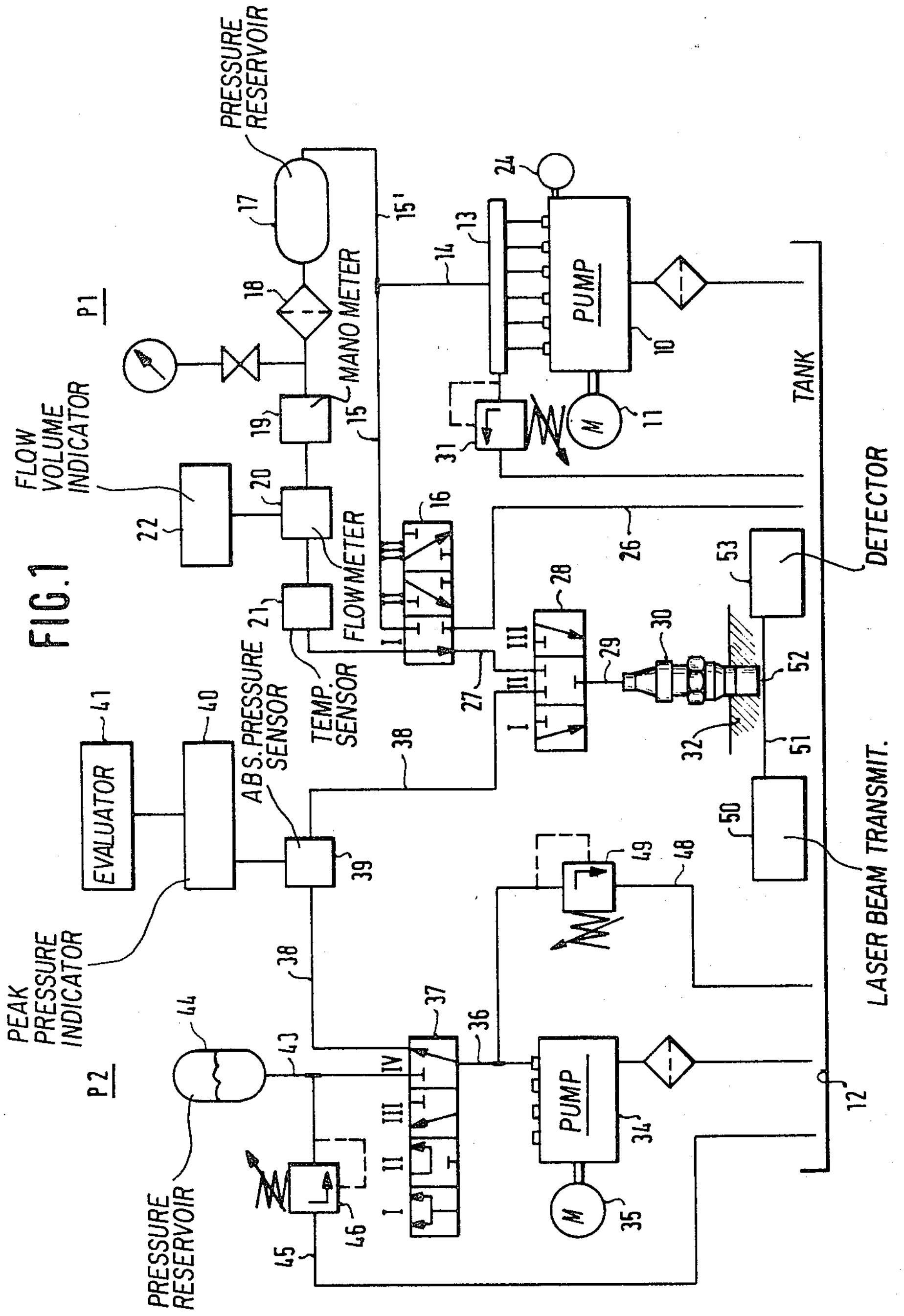
FIG. 1 is a view schematically showing a testing arrangement in accordance with the present invention.
Figure 2:
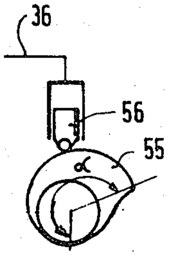
FIG. 2 is a view showing a fragment of the testing arrangement in accordance with the present invention.

In FIG. 1 a multi-cylinder injection pump is identified by reference numeral 10 and driven by a motor 11. It aspirates a pressure medium from a container 12, such as a testing oil, and supplies the same via a collecting pipe 13 into a pressure conduit 14. The pressure conduit 14 opens, on the one hand, into a conduit 15 which leads to a four/three-way valve 16, and on the other hand, into a branching conduit 15' with a pressure accumulator 17, a filter 18, an electronic manometer 19, a throughflow measuring transducer 20, and a temperature measuring element 21, from which it leads back to the valve 16. The above-listed elements are connected with one another in series. A throughflow indicator 22 is connected with the throughflow measuring transducer 20.

The injection pump 10 is so formed that it supplies the pressure medium with a constant pressure. For this purpose, it is provided with a servo motor 24 which is influenced by the electronic manometer 19. Such a construction is known and thereby is not described in further details. A conduit 26 leads from the valve 16 to the container 12, and a conduit 27 leads to a three/-three-way valve 28. From the outlet of the valve 28, a conduit 29 leads to an injection valve which will be referred thereafter as a nozzle holder combination 30. This term indicates a nozzle which is built in the nozzle holder and which later will be built in the motor. The above-described construction forms a first testing circuit P1 for the throughflow quantity measuring of the nozzle holder combination. The construction is secured by a pressure limiting valve 31.

The left half of FIG. 1 shows a second testing circuit P2 for testing opening pressure, buzzing condition and tightness of the nozzle holder combination. It has a pump 34 which is driven by a motor 35 with constant rotary speed. The pump aspirates the pressure medium from the container 12 and supplies it into a conduit 36 which leads to a three/four-way valve 37. From the valve 37, a first conduit 38 leads to a piezoelectric absolute pressure transducer 39, from which it further leads to the valve 28. The absolute pressure transducer 39 is connected with a peak pressure indicating device 40 with which an evaluating electronic device 41 is connected.

A second conduit 43 leads from the valve 37 to a pressure accumulator 44. A pressure regulating valve 46 is arranged in the conduit 43, and a conduit 45 leads from the pressure regulating valve 46 to the container 12. A pressure limiting valve 49 is connected with the conduit 36 and a leakage oil conduit 48 leads from the pressure limiting valve 39 to the container 12.

Under the nozzle holder combination 30, a laser light source 50 is arranged. A laser beam 51 extends directly beneath the nozzle opening 52 to a detector 53. The temperature of the pressure medium in the container 12 is retained constant by non-illustrated temperature control means.

Before the beginning of the measuring process, the nozzle holder combination 30 is inserted into a receiving device 32. With the aid of the first testing circuit P1, the hydraulic throughflow quantity of the nozzle holder combination is measured with the aid of the throughflow measuring transducer 20. The valve 16 is now in its switching position I, the valve 28 in its switching position III. The pressure accumulator 17 serves for compensating the pressure variations or vibrations which take place during the supply step of the pump 10. The testing pressure amounts, for example, in the event of pintle-type nozzles to 300 bar, in the event of orifice nozzles to 400 bar. The throughflow quantity transfuser 20 is formed advantageously as a turbine measuring transducer. During the measuring process the nozzle needle lies on the upper stroke stop, so that the throughflow through the injection nozzle is fully open. The throughflow indicator 22 registers the throughflow quantity. A limiting switch shows whether the throughflow quantity lies inside a predetermined tolerance field.

The testing circuit P2 serves for testing opening pressure, buzzing condition and tightness of the nozzle holder combination. For preparation of these tests, the valve 16 is first brought into the switching position II (the valve 28 as earlier in the switching position III), whereupon the pressure medium is directly supplied via the conduit 15 (so as to bypass the measuring devices 17 through 22) into the nozzle holder combination 30 to stimulate buzzing vibrations in the latter. After this, the valve 28 is brought to its switching position I, whereby the nozzle holder combination 30 is connected with the conduit 38. The continuously driven pump 34 has a cam 55 which over a cam angle alpha of approximately 250° supplies a constant volume stream per a degree of the cam angle. The cam acts upon a supply piston 56 which displaces the pressure medium into the conduit 36.

For testing the opening pressure and the buzzing condition, the valve 37 is brought in its switching position IV, whereupon the pressure medium flows into the conduit 38. The pressure in the conduit system increases until it attains the opening pressure of the nozzle holder combination and decreases in the event of opening of the nozzle needle to a pressure lower than the closing pressure. From this point, the process starts anew and repeats periodically as long as the supply stream remains constant. This process is referred to as buzzing.

The piezoelectric absolute pressure transducer 39 supplies the pressure signal to the peak pressure indicating device 40 which indicates the opening pressure.

The evaluating electronic device 41 connected therewith recognizes for the opening pressure control the first pressure peak and for the buzzing testing the further pressure peaks, counts them per unit time, and compares the count with a basic value (tolerance field).

Figure 3:
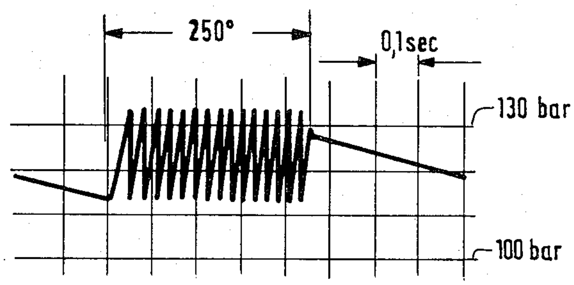
FIGS. 3 and 4 are views showing diagrams characterizing the operation of the testing arrangement.
Figure 4:
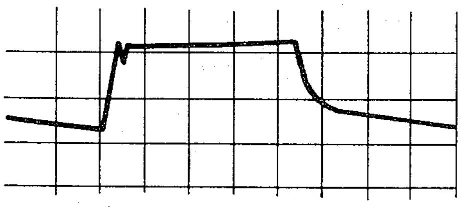

A nozzle is in order when it buzzes, which is shown in FIG. 3. FIG. 4 shows the pressure line of a nozzle which does not buzz, that is the pressure remains over the supply time substantially constant, which nozzle is not in order.

For the seat tightness testing of the nozzle holder combination, the valve 37 is brought to its switching position II. Thereby, the pressure accumulator 44 is connected via the conduit 43 with the conduit 38. The pressure accumulator is charged from the pump 34 to a value which is 10 bar lower than the nominal opening pressure. The valve 28 remains in its switching position I. The pressure medium flows now under the above-mentioned pressure to the nozzle holder combination 30 and into the nozzle. Since the pressure does not reach the opening pressure, the nozzle remains closed. In the testing position of the laser light source 50, the laser beam 51 deflects as liquid drops from the nozzle opening. Thereby conclusions may be drawn as to the seat-tightness of the nozzle holder combination in a well known manner.

The pressure accumulator 44 is charged when the valve 37 is in its switching position III. The pressure limiting valve 46 determines the pressure in the pressure accumulator.

For the tightness testing of the nozzle holder combination and the testing of the needle play, the nozzle holder combination 30 and the conduit 38 are subjected to the action of the pressure of the accumulator 44. For this purpose, the valve 37 is in its switching position II. The valve 37 is then brought to the position III, and immediately subsequent thereto the pressure peak is taken with the aid of the pressure transducer 39. In the evaluating electronic device 41, this value is compared in definite time intervals, for example, one second, with a given value. The pressure drop must not exceed a predetermined value.

Figure 5:
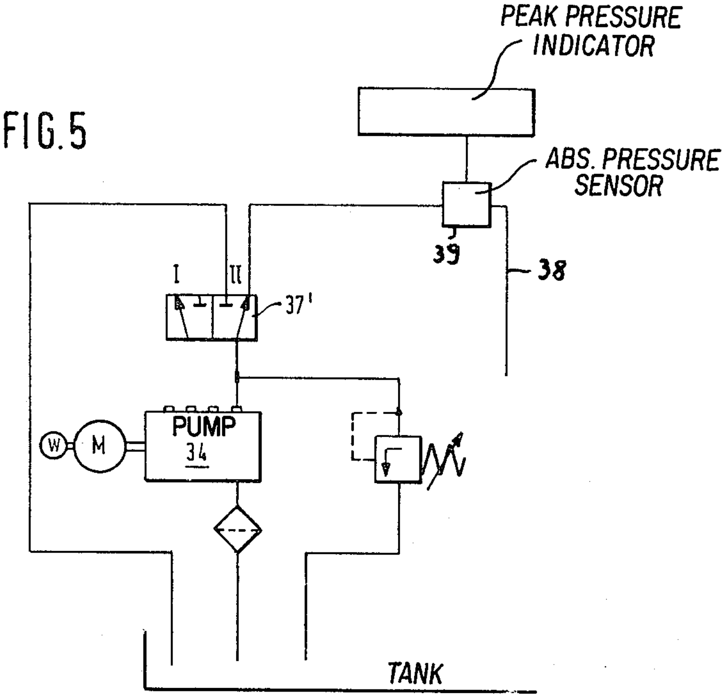
FIG. 5 is a view showing a further embodiment of the testing arrangement in accordance with the invention.

In the example shown in FIG. 5 only the second testing circuit P2 is changed and simplified in such a manner that the pressure accumulator 44 is dispensed with. The valve 37' is a three/two-way valve with the switching positions I and II which also eliminates the pressure limiting valve 46. In this embodiment the seat tightness testing and thereby the laser light source 50, 53 are dispensed with.

Figure 6:
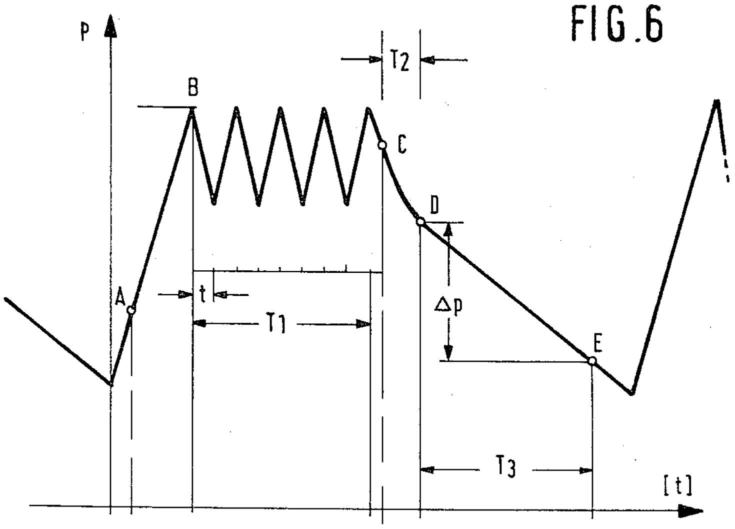
FIG. 6 is a view showing a third diagram characterizing the operation of the testing arrangement.

The evaluating electronic device 41 recognizes for opening pressure control the first pressure peak and for buzzing testing the further pressure peaks, counts them per unit time, and compares them with a basic value (tolerance field). For opening pressure, buzzing and tightness testing of the nozzle holder combination, the valve 37' is brought to its switching position II. The pressure medium supplied from the pump flows via the valve 28 to the nozzle holder combination. The above-mentioned testing operations are performed during rotation of the pump cams, as can be seen in the diagram of FIG. 6.

The time is indicated on the abscissa and the pressure is indicated on the alternate of this diagram. The point A shows the beginning of the opening pressure testing, the point B shows the opening pressure, $T_1$ indicates the time span of the buzzing which extends to supply end of point C. After a time interval $T_2$, the pressure drop testing starts in the point D, and ends after $T_3$ in the point E. The sequence of the tests can be interchanged.

It will be understood that each of the elements described above, or two or more together, may also find a useful application in other types of constructions differing from the types described above.

While the invention has been illustrated and described as embodied in a testing arrangement for testing injection nozzles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A testing arrangement for testing injection nozzles in a nozzle holder combination, as to throughflow, opening pressure, buzzing condition, tightness of the nozzle holder combination, and if necessary seat tightness and needle play of a nozzle, the testing arrangement comprising receiving means arranged to receive a nozzle holder combination; control means connected to said nozzle holder combination and arranged so that a hydraulic pressure medium at constant temperature flows therethrough and comprising testing means including a first testing circuit provided with a first pump for the hydraulic pressure medium and arranged for testing as to the throughflow, and a second circuit provided with a second pump for the hydraulic pressure medium and arranged for testing as to the opening pressure, buzzing condition, and tightness of nozzle holder combination, said control means further including a hydraulic switching means connected to the first and second testing circuits and to said nozzle holder combination so as to control all testing operations during a single testing cycle.

2. A testing arrangement as defined in claim 1, wherein said second pump of said second testing circuit is arranged to supply a constant quantity of the pressure medium per unit time during a testing cycle.

3. A testing arrangement as defined in claim 2, wherein said second pump of said second testing circuit has a rotatable pump cam and is arranged to supply a constant quantity of the pressure medium per unit time during a partial rotation of said pump cam.

4. A testing arrangement as defined in claim 1, wherein said second testing circuit has a pressure accumulator and a control valve arranged for connecting the nozzle only during the seat tightness testing with the pressure accumulator which supplies the pressure medium with a pressure which is slightly lower than the opening pressure of the nozzle.

5. A testing arrangement as defined in claim 1; and further comprising a pressure transducer formed as an absolute pressure transducer arranged to provide an information about the pressure as an electrical signal; and indicating means arranged to receive the electric signal from said pressure transducer.

6. A testing arrangement as defined in claim 1; and further comprising a laser light source arranged for emitting a beam extending directly over a nozzle opening; and a detector arranged to detect and evaluate the beam as a measure of needle seat tightness.

7. A testing arrangement as defined in claim 1, wherein said first pump of said first testing circuit is adjusted to a constant pressure, said first testing circuit including successively arranged a pressure accumulator for damping pressure variations, a manometer, a throughflow measuring transducer and a temperature measuring instrument.

8. A testing arrangement as defined in claim 1, wherein said first testing circuit includes measuring means connected in series to the first pump, said switching means being operable to supply directly the pressure medium to said nozzle holder combination so as to bypass said measuring means.

9. A testing arrangement as defined in claim 1, wherein said second testing circuit has an additional conduit and a pressure accumulator arranged in said additional conduit, said pressure accumulator being chargeable via a control valve which is located downstream of said second pump and also being connectable with said second testing circuit.

10. A testing arrangement as defined in claim 1, wherein said second pump of said second testing circuit has a cam which supplies a constant volume stream of pressure medium per a degree of its rotation over an angle of rotation of substantially 250°.

11. A testing arrangement as defined in claim 1; and further comprising electronic evaluating means arranged in said testing means to evaluate measured data in said second circuit.

12. A testing arrangement as defined in claim 1, wherein said second pump of said second testing circuit is an injection pump.

* * * * *